United States Patent
Liu et al.

(10) Patent No.: US 9,456,446 B1
(45) Date of Patent: *Sep. 27, 2016

(54) METHOD AND APPARATUS FOR FACILITATING SIMULTANEOUS TRANSMISSION FROM MULTIPLE STATIONS

(71) Applicant: Marvell International Ltd., Hamilton (BM)

(72) Inventors: Yong Liu, Campbell, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/981,289

(22) Filed: Dec. 28, 2015

Related U.S. Application Data

(63) Continuation of application No. 14/537,388, filed on Nov. 10, 2014, now Pat. No. 9,226,294, which is a continuation of application No. 12/963,053, filed on Dec. 8, 2010, now Pat. No. 8,886,755.

(60) Provisional application No. 61/285,114, filed on Dec. 9, 2009.

(51) Int. Cl.
*H04Q 9/04* (2006.01)
*H04Q 9/12* (2006.01)
(Continued)

(52) U.S. Cl.
CPC ..... *H04W 72/0446* (2013.01); *H04W 72/0406* (2013.01); *H04W 74/04* (2013.01); *H04W 84/12* (2013.01)

(58) Field of Classification Search
CPC ............ H04B 1/50; H04B 1/52; H04B 1/54; H04B 1/56

USPC .......................... 709/218; 370/278, 280, 281
See application file for complete search history.

(56) References Cited

U.S. PATENT DOCUMENTS 6,377,548 B1 * 4/2002 Chuah ................. H04L 12/2602
370/233
6,469,991 B1 * 10/2002 Chuah ................. H04L 43/0847
370/329

(Continued)

FOREIGN PATENT DOCUMENTS

EP      907263      4/1999
EP      1168877      1/2002

(Continued)

OTHER PUBLICATIONS

IEEE P802.1AS/D0.8, "Draft Standard for Local and Metropolitan Area Networks—Timing and Synchronization for Time-Sensitive Applications in Bridged Local Area Networks," The Institute of Electrical and Electronics Engineers, Inc., pp. 1-149 (May 25, 2007).

(Continued)

*Primary Examiner* — Kostas Katsikis

(57) ABSTRACT

A first communication device determines that each second communication device in a plurality of second communication devices has respective data to be transmitted to the first communication device. The first communication device transmits a request to the plurality of second communication devices to transmit data to the first communication device simultaneously during a transmit opportunity period of the first communication device. The first communication device receives data transmitted simultaneously by the plurality of second communication devices during the transmit opportunity period of the first communication device.

20 Claims, 11 Drawing Sheets

(51) Int. Cl.
*H04W 72/04* (2009.01)
*H04W 74/04* (2009.01)
*H04W 84/12* (2009.01)

(56) References Cited

U.S. PATENT DOCUMENTS

| | | | |
|---|---|---|---|
| 6,519,229 B1 | 2/2003 | Arai et al. | |
| 6,654,921 B1 * | 11/2003 | Jones | H04L 1/0054 370/204 |
| 6,657,949 B1 * | 12/2003 | Jones, IV | H04L 5/0053 370/205 |
| 6,717,926 B1 * | 4/2004 | Deboille | H04W 48/12 370/328 |
| 6,816,502 B2 * | 11/2004 | Ekl | H04W 48/12 370/447 |
| 6,947,388 B1 | 9/2005 | Wagner | |
| 7,599,332 B2 | 10/2009 | Zelst et al. | |
| 7,742,390 B2 | 6/2010 | Mujtaba | |
| 7,822,005 B2 | 10/2010 | Ptasinski et al. | |
| 8,144,647 B2 | 3/2012 | Nabar et al. | |
| 8,149,811 B2 | 4/2012 | Nabar et al. | |
| 8,155,138 B2 | 4/2012 | van Nee | |
| 8,194,604 B2 | 6/2012 | Gault et al. | |
| 8,289,869 B2 | 10/2012 | Sawai | |
| 8,380,881 B2 | 2/2013 | Li et al. | |
| 8,472,383 B1 | 6/2013 | Banerjea et al. | |
| 8,526,351 B2 | 9/2013 | Fischer et al. | |
| 8,571,010 B1 * | 10/2013 | Zhang | H04L 29/10 370/230 |
| 8,599,803 B1 | 12/2013 | Zhang et al. | |
| 8,619,907 B2 | 12/2013 | Mujtaba et al. | |
| 8,630,680 B2 | 1/2014 | Frederiks et al. | |
| 8,660,497 B1 | 2/2014 | Zhang et al. | |
| 8,724,720 B2 | 5/2014 | Srinivasa et al. | |
| 8,886,755 B1 | 11/2014 | Liu et al. | |
| 9,172,455 B2 * | 10/2015 | Wentink | H04B 7/0617 |
| 9,226,294 B1 | 12/2015 | Liu et al. | |
| 2002/0026523 A1 | 2/2002 | Mallory et al. | |
| 2002/0181492 A1 | 12/2002 | Kasami et al. | |
| 2004/0001429 A1 | 1/2004 | Ma et al. | |
| 2004/0102202 A1 | 5/2004 | Kumaran et al. | |
| 2004/0127169 A1 * | 7/2004 | Ota | H04B 1/0057 455/83 |
| 2005/0068924 A1 | 3/2005 | Lindskog et al. | |
| 2005/0135284 A1 | 6/2005 | Nanda et al. | |
| 2005/0135318 A1 | 6/2005 | Walton et al. | |
| 2005/0185614 A1 | 8/2005 | Ikeda | |
| 2006/0045048 A1 | 3/2006 | Kwon et al. | |
| 2006/0084469 A1 * | 4/2006 | Malone | H04B 1/0053 455/552.1 |
| 2006/0171362 A1 | 8/2006 | Garg et al. | |
| 2006/0221879 A1 | 10/2006 | Nakajima et al. | |
| 2007/0004440 A1 | 1/2007 | Breuer et al. | |
| 2007/0066314 A1 | 3/2007 | Sherman et al. | |
| 2007/0086370 A1 | 4/2007 | Jang et al. | |
| 2007/0237181 A1 | 10/2007 | Cho et al. | |
| 2008/0056295 A1 * | 3/2008 | Loda | H04L 45/10 370/437 |
| 2008/0075058 A1 | 3/2008 | Mundarath et al. | |
| 2008/0130483 A1 | 6/2008 | Khandekar et al. | |
| 2008/0159419 A1 | 7/2008 | Smith et al. | |
| 2008/0212506 A1 * | 9/2008 | Lee | H04W 72/042 370/310 |
| 2008/0316959 A1 | 12/2008 | Bachl et al. | |
| 2008/0318612 A1 | 12/2008 | Axnas et al. | |
| 2009/0022093 A1 | 1/2009 | Nabar et al. | |
| 2009/0022128 A1 | 1/2009 | Nabar et al. | |
| 2009/0040928 A1 | 2/2009 | Wang et al. | |
| 2009/0067383 A1 * | 3/2009 | Fleming | H04B 1/52 370/330 |
| 2009/0116434 A1 * | 5/2009 | Lohr | H04L 5/0007 370/329 |
| 2009/0128684 A1 | 5/2009 | Apel | |
| 2009/0129304 A1 | 5/2009 | Kim et al. | |
| 2009/0196163 A1 | 8/2009 | Du | |
| 2009/0225710 A1 | 9/2009 | Gupta et al. | |
| 2009/0232234 A1 | 9/2009 | Du | |
| 2009/0316585 A1 | 12/2009 | Srinivasan et al. | |
| 2009/0316621 A1 | 12/2009 | Lane et al. | |
| 2009/0325504 A1 | 12/2009 | Aiba et al. | |
| 2010/0029325 A1 | 2/2010 | Wang et al. | |
| 2010/0046358 A1 | 2/2010 | van Nee | |
| 2010/0054168 A1 | 3/2010 | Igarashi et al. | |
| 2010/0061334 A1 | 3/2010 | Gault et al. | |
| 2010/0128648 A1 * | 5/2010 | Lee | H04W 74/002 370/312 |
| 2010/0165959 A1 | 7/2010 | Park et al. | |
| 2010/0220601 A1 | 9/2010 | Vermani et al. | |
| 2010/0309834 A1 | 12/2010 | Fischer et al. | |
| 2011/0002219 A1 | 1/2011 | Kim et al. | |
| 2011/0038299 A1 * | 2/2011 | Sugawara | H04L 12/189 370/312 |
| 2011/0038332 A1 | 2/2011 | Liu et al. | |
| 2011/0053527 A1 | 3/2011 | Hunzinger | |
| 2011/0096796 A1 | 4/2011 | Zhang et al. | |
| 2011/0096797 A1 | 4/2011 | Zhang et al. | |
| 2011/0128929 A1 | 6/2011 | Liu et al. | |
| 2011/0128947 A1 | 6/2011 | Liu et al. | |
| 2011/0235596 A1 | 9/2011 | Wentink | |
| 2011/0310827 A1 | 12/2011 | Srinivasa et al. | |
| 2015/0049727 A1 | 2/2015 | Wentink et al. | |

FOREIGN PATENT DOCUMENTS

| | | | |
|---|---|---|---|
| JP | 10136446 | 5/1998 | |
| JP | 11069426 | 3/1999 | |
| JP | 2005197798 A * | 7/2005 | |
| KR | 1650902 A1 * | 4/2006 | H04W 16/14 |
| WO | WO-2008/025040 | 2/2008 | |

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.,* pp. 1-83 (Sep. 1999).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.,* pp. 1-23 (Nov. 7, 2001).

IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements," *The Institute of Electrical and Electronics Engineers, Inc.,* pp. 1-196 (Oct. 2004).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2/4 GHz Band,"*The Institute of Electrical and Electronics Engineers, Inc.,* pp. 1-69 (Apr. 2003).

IEEE P802.11n™/D3.00, "Draft Standard for Information Technology—Telecommunications and information exchange between systems—Local and metropolitan area networks—Specific requirements, Part 11: Wireless LAN Medium Access Control (MAC) and

(56) References Cited

OTHER PUBLICATIONS

Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. Jan. 1184 (Jun. 12, 2007).

Chen, "Home Network Basis: Transmission Environments and Wired/Wireless Protocols," *Prentice Hall*, pp. 1-26 (Jul. 2003).

Gunnam et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

Hiertz et al., "The IEEE 802.11 Universe," *IEEE Communications Magazine*, pp. 62-70, (Jan. 2010).

Kumaran et al., "Uplink Scheduling in CDMA Packet-Data Systems," Journal Wireless Networks, vol. 2, Issue 1, pp. 33-43 (Feb. 2006).

Mujtaba, "IEEE P802.11—Wireless LANs, TGn Sync Proposal Technical Specification," *The Institute of Electrical and Electronics Engineers, Inc.*, doc.: IEEE 802.11—04/0889r6, pp. 1-131 (May 2005).

van Nee et al. "The 802.11n MIMO-OFDM Standard for Wireless LAN and Beyond," Wireless Personal Communications, vol. 37, pp. 445-453 (Jun. 2006).

U.S. Appl. No. 12/730,651, Zhang et al., "OFDMA with Block tone Assignment for WLAN," filed Mar. 24, 2010.

\* cited by examiner

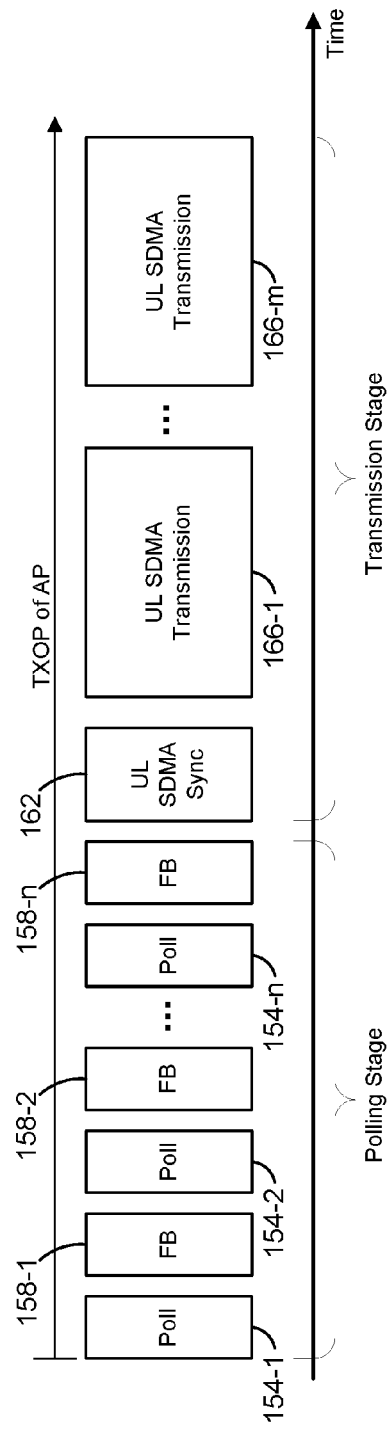
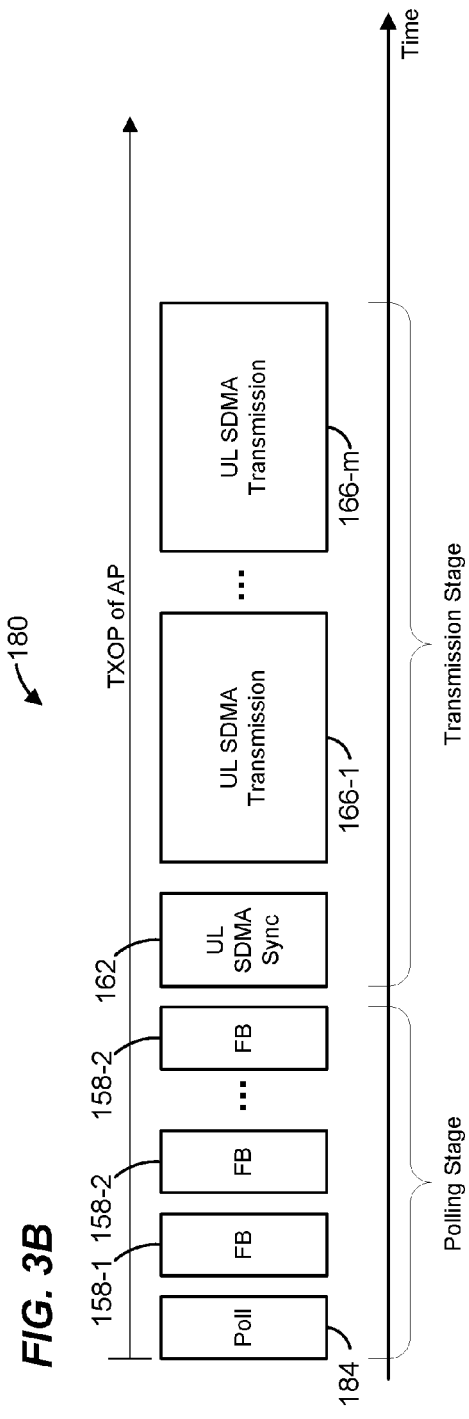

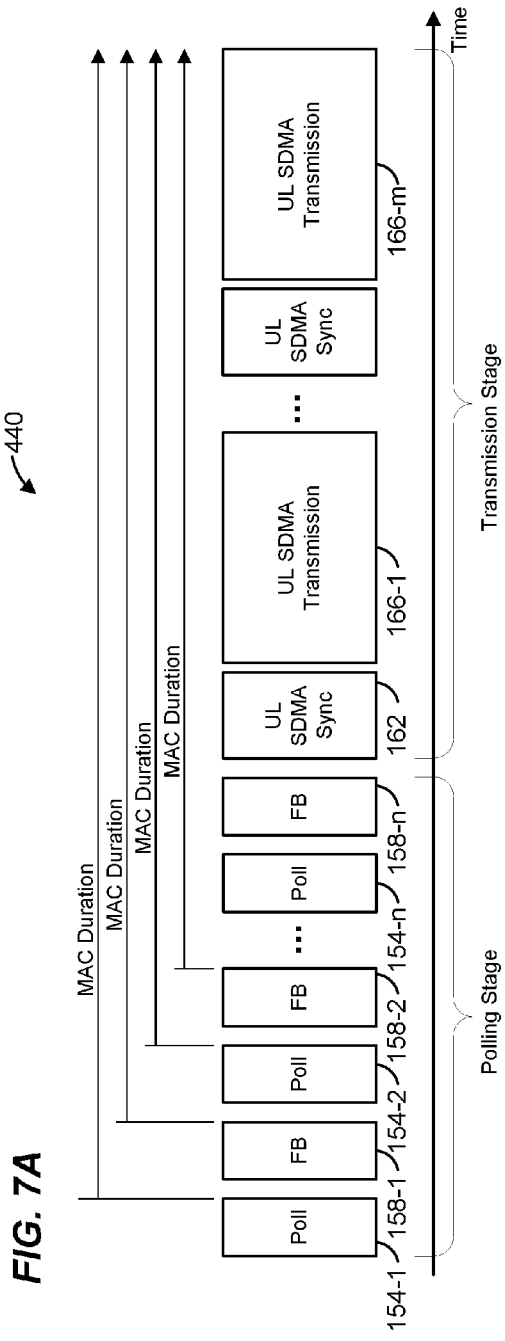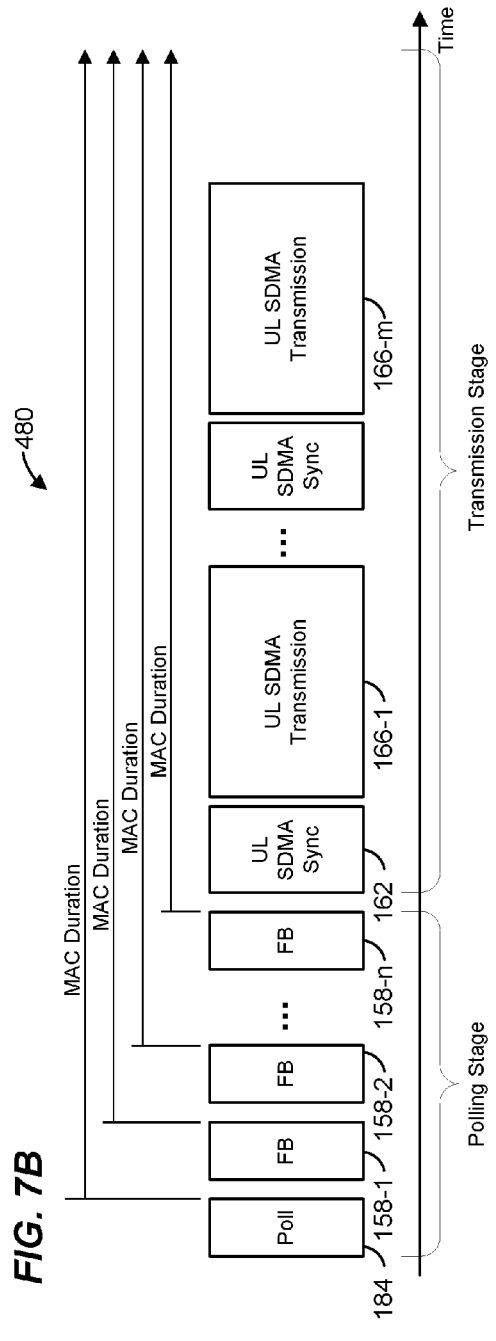

METHOD AND APPARATUS FOR FACILITATING SIMULTANEOUS TRANSMISSION FROM MULTIPLE STATIONS

CROSS-REFERENCES TO RELATED APPLICATION

The present application is a continuation of U.S. application Ser. No. 14/537,388, now U.S. Pat. No. 9,226,294, entitled "Method and Apparatus for Facilitating Simultaneous Transmission from Multiple Stations," filed Nov. 10, 2014, which is a continuation of U.S. application Ser. No. 12/963,053, now U.S. Pat. No. 8,886,755, entitled "Method and Apparatus for Facilitating Simultaneous Transmission from Multiple Stations," filed Dec. 8, 2010, which claims the benefit of U.S. Provisional Patent Application No. 61/285,114, entitled "Uplink SDMA Supports," filed on Dec. 9, 2009. The disclosures of all of the applications listed above are hereby incorporated by reference herein in their entireties.

FIELD OF TECHNOLOGY

The present disclosure relates generally to communication systems and, more particularly, to wireless networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In an embodiment, a method comprises determining that each first communication device in a plurality of first communication devices has respective data to be transmitted to a second communication device, and transmitting a request to the plurality of first communication devices to transmit data to the second communication device simultaneously during a transmit opportunity period of the second communication device. The method also comprises receiving, at the second communication device, data simultaneously transmitted by the plurality of first communication devices during the transmit opportunity period of the second communication device. In another embodiment, a network interface is configured to perform the acts of the method described above.

BRIEF DESCRIPTION OF THE DRAWINGS

FIGS. 3A and 3B are diagrams of other example transmission sequences in a WLAN, according to other embodiments.

FIGS. 7A and 7B are diagrams of other example transmission sequences in a WLAN, according to other embodiments.

DETAILED DESCRIPTION

In embodiments described below, a first communication device, such as an access point (AP) of a wireless local area network (WLAN), simultaneously receives multiple independent data streams from multiple second communication devices, such as client stations. The first communication device determines that the second communication devices have data to transmit to the first communication device. Then, the first communication device prompts the second communication devices to simultaneously transmit the data streams during a transmit opportunity period (TXOP) of the first communication device. In an embodiment, a TXOP is a bounded time interval reserved for a communication device in a network during which the communication device can send as many frames as possible (as long as the duration of the transmissions does not extend beyond the TXOP). In an embodiment, other communication devices are generally not permitted to transmit in the TXOP unless the communication device that owns the TXOP specifically permits the other communication device to transmit or unless the other communication device is acknowledging a transmission of the communication device that owns the TXOP.

Figure 1:
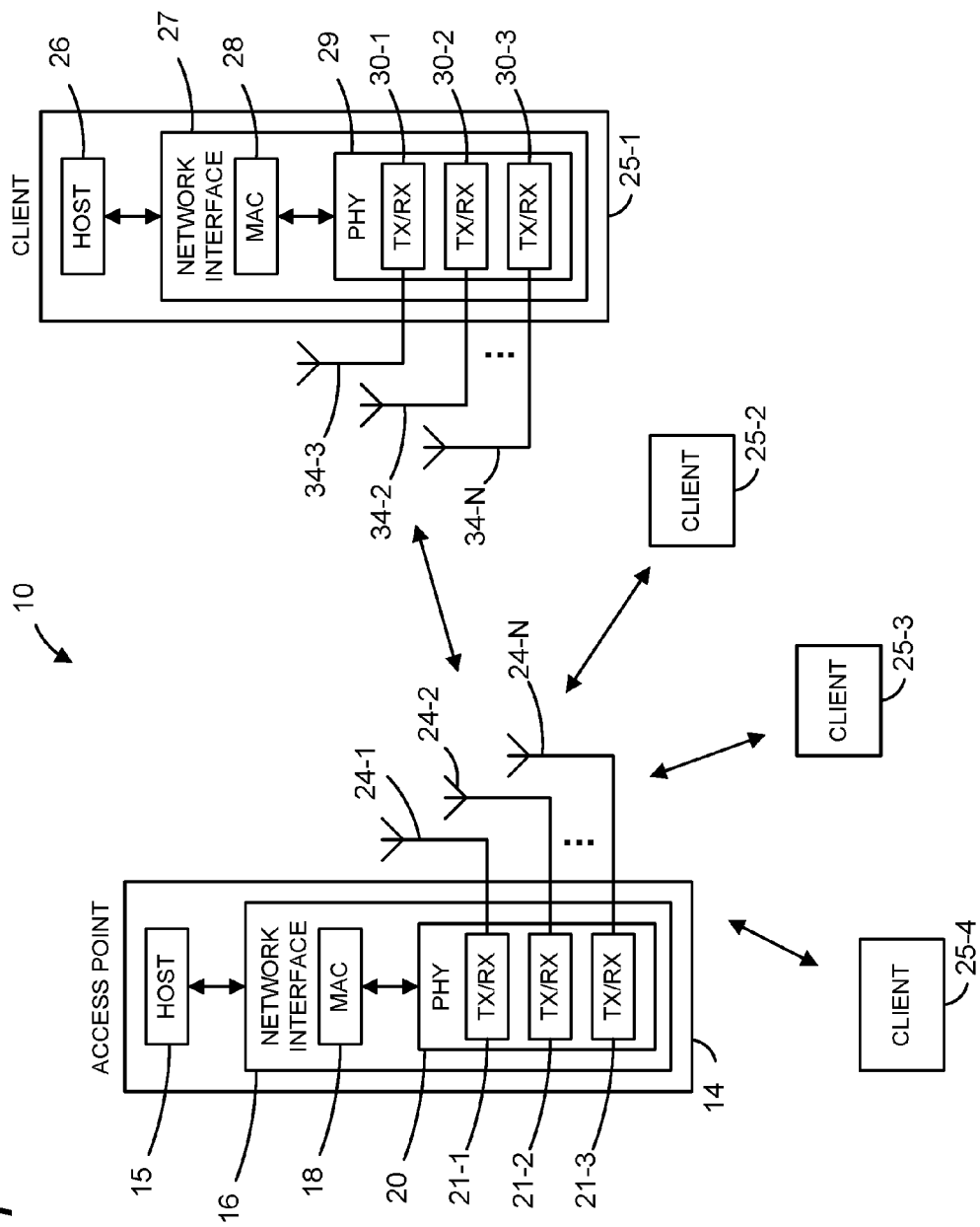
FIG. 1 is a block diagram of an example wireless local area network (WLAN) communication system in which an access point (AP) prompts the client stations (clients) to simultaneously transmit independent data during a transmit opportunity period (TXOP) of the AP.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. In some embodiments, the AP 14 is configured to transmit independent data to two or more of the client stations 25 simultaneously. In other embodiments, the AP 14 is configured, additionally or alternatively, to receive respective data streams that are transmitted simultaneously by the two or more client stations 25. For example, in one embodiment, the network interface 16 is configured to transmit independent data simultaneously to multiple client stations 25 via multiple spatial streams using techniques described in U.S. patent application Ser. No. 12/175,526, entitled "Access Point with Simultaneous Downlink Transmission of Independent Data for Multiple Client Stations," filed on Jul. 18, 2008, which is hereby incorporated by reference. As another example, in another embodiment, the network interface 16, additionally or alternatively, is configured to receive independent data streams transmitted simultaneously by multiple client stations 25 via different spatial streams using techniques described in U.S. patent application Ser. No. 12/175,501, entitled "Wireless Network with Simultaneous Uplink Transmission of Independent Data from Multiple Client Stations," filed on Jul. 18, 2008, which is hereby incorporated by reference.

As another example, in another embodiment, the network interface 16, additionally or alternatively, is configured to transmit independent data simultaneously to multiple client stations 25 via different respective sets of orthogonal frequency division multiplexing (OFDM) subchannels using techniques described in U.S. patent application Ser. No. 12/730,651, entitled "OFDMA with Block Tone Assignment for WLAN," filed on Mar. 24, 2010, which is hereby incorporated by reference. As another example, in another embodiment, the network interface 16, additionally or alternatively, is configured to receive independent data streams transmitted simultaneously by multiple client stations 25 via different respective sets of OFDM subchannels using techniques described in U.S. patent application Ser. No. 12/730,651.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas, according to an embodiment.

In some embodiments, two or more of the client stations 25 are configured to receive respective data streams that are transmitted simultaneously by the AP 14. In other embodiments, two or more of the client stations 25 additionally or alternatively are configured to transmit corresponding data streams to the AP 14 such that the AP 14 receives the data streams simultaneously. For example, in one embodiment, the network interface 27 is configured to receive a data stream among a plurality of independent data streams transmitted simultaneously by the AP 14 to multiple client stations 25 via multiple spatial streams using techniques described in U.S. patent application Ser. No. 12/175,526. As another example, in another embodiment, the network interface 27, additionally or alternatively, is configured to receive a data stream among a plurality of independent data streams transmitted simultaneously by the AP 14 to multiple client stations 25 via different respective sets of OFDM subchannels using techniques described in U.S. patent application Ser. No. 12/730,651.

As another example, in another embodiment, the network interface 27, additionally or alternatively, is configured to transmit a data stream to the AP 14 among a plurality of independent data streams transmitted simultaneously by multiple client stations 25 via different spatial streams using techniques described in U.S. patent application Ser. No. 12/175,501. As another example, in another embodiment, the network interface 27, additionally or alternatively, is configured to transmit a data stream to the AP 14 among a plurality of independent data streams transmitted simultaneously by multiple client stations 25 via different respective sets of OFDM subchannels using techniques described in U.S. patent application Ser. No. 12/730,651.

Figure 2:
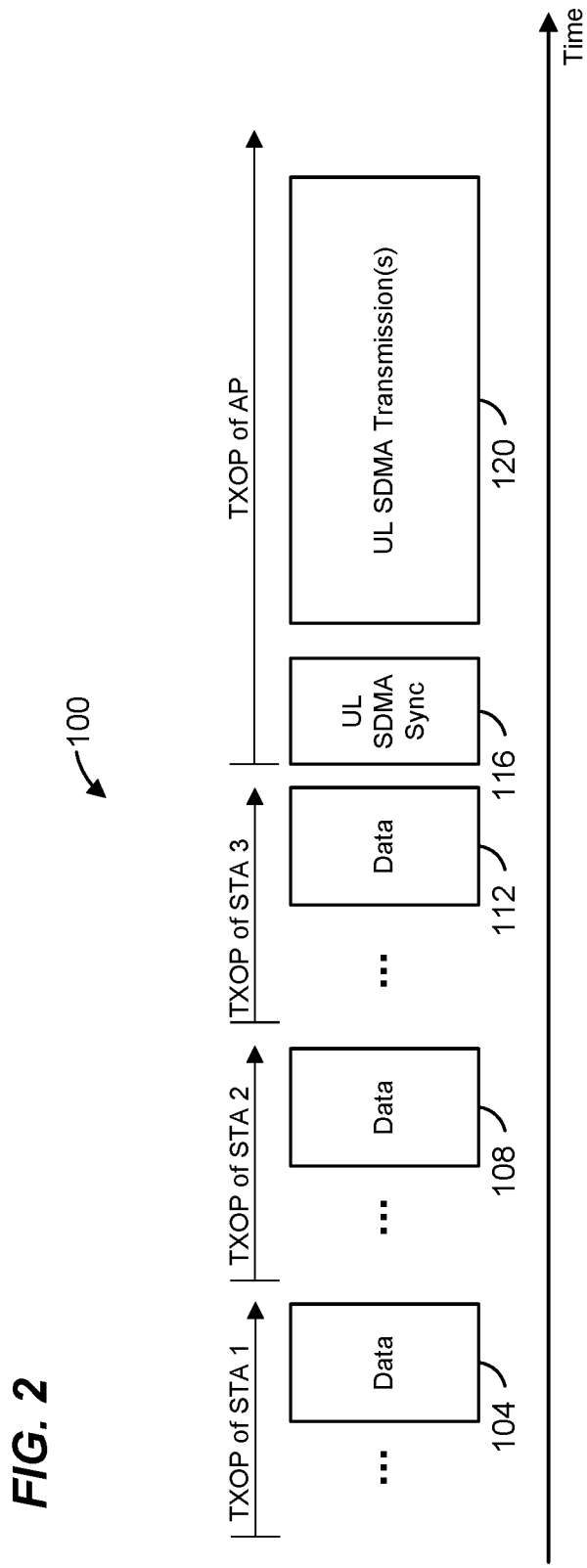
FIG. 2 is a diagram of an example transmission sequence in a WLAN, according to an embodiment.

FIG. 2 is a diagram of an example transmission sequence 100 in a WLAN, such as the WLAN 10 of FIG. 1, according to an embodiment, in which an AP determines that a plurality of client stations have data that is to be transmitted to an AP. In a TXOP of a first client station (STA1), STA1 transmits one or more data frames, including a data frame 104. At least the data frame 104 includes information indicating whether STA1 has data that is to be transmitted to the AP. In an embodiment, the information indicating whether STA1 has data that is to be transmitted to the AP is an indication of an amount of data in a queue corresponding to data that is to be transmitted to the AP. In an embodiment, the indication of the amount of data in the queue is field in a MAC header of the data frame 104. In an embodiment, the indication of the amount of data in the queue is subfield in a quality of service (QoS) field of the MAC header. In an embodiment, the queue corresponds to a particular traffic category. In an embodiment, the queue corresponds to a particular traffic stream. In an embodiment, the queue corresponds to a particular traffic category or stream. In an embodiment, the queue corresponds to a particular traffic identifier (TID) such as the TID described in the IEEE 802.11e Standard.

In an embodiment, at least the last data frame 104 transmitted by STA1 in the TXOP of STA1 includes the information indicating whether STA1 has data that is to be transmitted to the AP. In an embodiment, a certain number (e.g., 1, 2, 3, etc.) of the last data frames transmitted by STA1 in the TXOP of STA1 includes the information indicating whether STA1 has data that is to be transmitted to the AP. In an embodiment, all of the data frames transmitted by STA1 in the TXOP of STA1 include the information indicating whether STA1 has data that is to be transmitted to the AP.

Similarly, in a TXOP of a second client station (STA2), STA2 transmits one or more data frames, including a data frame 108. At least the data frame 108 includes information indicating whether STA2 has data that is to be transmitted to the AP. Similarly, in a TXOP of a third client station (STA3), STA3 transmits one or more data frames, including a data frame 112. At least the data frame 112 includes information indicating whether STA3 has data that is to be transmitted to the AP.

The AP receives the data frames 104, 108, 112 and/or other data frames from STA1, STA2, and STA3 that include the information indicating whether STA1, STA2, and STA3 have data that is to be transmitted to the AP, and uses this information to determine whether STA1, STA2, and STA3 have data that is to be transmitted to the AP. In the scenario illustrated in FIG. 2, the AP determines that STA1, STA2, and STA3 have data that is to be transmitted to the AP. As a result, the AP generates and transmits a communication frame that prompts STA1, STA2, and STA3 to transmit independent data simultaneously to the AP during a TXOP of the AP. In one embodiment, the AP generates and transmits a communication frame that prompts STA1, STA2, and STA3 to transmit independent data simultaneously to the AP via different spatial streams. In one embodiment, the AP generates and transmits an uplink (UL) spatial division multiple access (SDMA) synchronization communication frame (UL SDMA Sync frame) 116 to prompt STA1, STA2, and STA3 to transmit independent data simultaneously to the AP via different respective sets of spatial streams. In another embodiment, the AP generates and transmits a communication frame that prompts STA1, STA2, and STA3 to transmit independent data simultaneously to the AP via different respective sets of OFDM subchannels. The communication frame that prompts STA1, STA2, and STA3 to transmit independent data simultaneously to the AP will be discussed in more detail below.

In an embodiment in which STA1, STA2, and STA3 each transmit to the AP information indicating an amount of data in a queue that corresponds to a particular traffic category, traffic stream, or TID, the AP generates the communication frame 116 to prompt STA1, STA2, and STA3 to transmit data that corresponds to the particular traffic category, traffic stream, or TID. In an embodiment, the AP obtains a TXOP based on channel access parameters associated with a certain traffic category, traffic stream, or TID. In other words, each TXOP obtained by the AP is associated with a corresponding certain traffic category, traffic stream, or TID (e.g., a first TID). In an embodiment, during a TXOP, the AP prompts STAs to transmit data corresponding to the first TID. On the other hand, in some scenarios, not all STAs or even one STA has data corresponding to the first TID that is to be sent to the AP. In such scenarios, in an embodiment, the AP polls STAs that do not have data corresponding to the first TID to transmit to the AP information indicating an amount of data in a queue that corresponds to a second TID. Then, the AP generates a communication frame similar to frame 116 to prompt STAs to transmit data that corresponds to the first TID or the second TID. In other embodiments, the AP polls STAs to transmit to the AP information indicating an amount of data in a queue that corresponds to a plurality of TIDs or all TIDs.

In response to the communication frame 116, STA1, STA2, and STA3 transmit independent data simultaneously to the AP during the TXOP of the AP. For example, in an embodiment, STA1, STA2, and STA3 generate and transmit one or more UL SDMA transmissions 120 via different spatial streams. In another embodiment, STA1, STA2, and STA3 generate and transmit independent data simultaneously to the AP via different respective sets of OFDM subchannels. In an embodiment, the UL SDMA transmissions 120 correspond to a particular traffic category, traffic stream, or TID indicated by the communication frame 116. In another embodiment, the UL SDMA transmissions 120 at least includes a traffic category, traffic stream, or TID associated with the TXOP or indicated by the communication frame 116 (e.g., the UL-SDMA transmissions can include data traffic belonging to more than one TID).

FIG. 3A is a diagram of another example transmission sequence 150 in a WLAN, such as the WLAN 10 of FIG. 1, according to another embodiment, in which an AP determines that a plurality of client stations have data that is to be transmitted to an AP. In a TXOP of the AP, the AP generates and transmits a plurality of polling communication frames 154 to a plurality of client stations. Each polling communication frame 154 includes information that prompts a respective client station to transmit information indicating whether the client station has data that is to be transmitted to the AP. In an embodiment, the polling communication frame 154 includes a request for the client station to transmit the information indicating whether the client station has data that is to be transmitted to the AP. In an embodiment, each polling communication frame 154 prompts the client station to transmit information indicating an amount of data in a particular traffic category, traffic stream, or TID that is to be transmitted to the AP. In an embodiment, each polling communication frame 154 prompts the client station to transmit information indicating an amount of data in one or more or all traffic categories, traffic streams, or TIDs that are to be transmitted to the AP.

In response to each polling communication frame 154, a respective client station transmits a communication frame 158 to the AP during the TXOP of the AP, where the communication frame 158 (referred to herein as a feedback frame or FB frame) includes information indicating whether the client station has data to be transmitted to the AP. In an embodiment, the information indicating whether the client station has data that is to be transmitted to the AP is an indication of an amount of data in a queue corresponding to data that is to be transmitted to the AP. In an embodiment, the queue corresponds to a particular traffic category. In an embodiment, the queue corresponds to a particular traffic stream. In an embodiment, the queue corresponds to a particular traffic category or stream. In an embodiment, the queue corresponds to a particular TID such as the TID described in the IEEE 802.11e Standard. In an embodiment, the queue corresponds to a plurality of traffic categories or traffic streams with pending data. In an embodiment, the queue corresponds to all traffic categories or traffic streams with pending data. In an embodiment, the queue corresponds to a plurality of TIDs with pending data. In an embodiment, the queue corresponds to all TIDs with pending data. In an embodiment, the indication of the amount of data in the queue is field in a MAC header of the FB frame 158. In an embodiment, the indication of the amount of data in the queue is subfield in a QoS field of the MAC header. In an embodiment, each FB frame 158 indicates an amount of data in the particular traffic category (or categories), traffic stream(s), or TID(s) indicated by the polling frame 154.

The AP receives the FB frames 158 that include the information indicating whether the client stations have data that is to be transmitted to the AP, and uses this information to determine whether the client stations have data that is to be transmitted to the AP. In the scenario illustrated in FIG. 3A, the AP determines that multiple client stations have data that is to be transmitted to the AP. As a result, the AP generates and transmits a communication frame 162 that prompts the multiple client stations to transmit independent data simultaneously to the AP during the TXOP of the AP. In one embodiment, the AP generates and transmits a communication frame 162 that prompts the multiple client stations to transmit independent data simultaneously to the AP via different spatial streams. In one embodiment, the AP generates and transmits an UL SDMA Sync frame 162 to prompt the multiple client stations to transmit independent data simultaneously to the AP via different spatial streams. In another embodiment, the AP generates and transmits a communication frame that prompts the multiple client stations to transmit independent data simultaneously to the AP via different respective sets of OFDM subchannels.

In an embodiment, the AP determines whether the client stations have data corresponding to the particular traffic category (or categories), traffic stream(s), or TID(s) that are to be transmitted to the AP.

In response to the communication frame 162, the multiple client stations transmit independent data simultaneously to the AP during the TXOP of the AP in one or more transmissions 166. For example, in an embodiment, the multiple client stations generate and transmit one or more UL SDMA transmissions 166 via different spatial streams. In another embodiment, the multiple client stations transmit independent data simultaneously to the AP via different respective sets of OFDM subchannels.

In an embodiment, the UL SDMA transmissions 166 correspond to a particular traffic category, traffic stream, or TID indicated by the communication frame 162. In an embodiment, the UL SDMA transmissions 166 at least include the traffic category, traffic stream, or TID associated with the TXOP or indicated by the communication frame 162.

FIG. 3B is a diagram of another example transmission sequence 180 in a WLAN, such as the WLAN 10 of FIG. 1, according to another embodiment, in which an AP determines that a plurality of client stations have data that is to be transmitted to an AP. The transmission sequence 180 is similar to the transmission sequence 150 of FIG. 3A. In the transmission sequence 180, however, the AP generates and transmits a single polling communication frame 184 to a plurality of client stations. The polling communication frame 184 includes information that prompts each client station in a plurality of client stations to transmit information indicating whether the client station has data that is to be transmitted to the AP. In an embodiment, the polling communication frame 184 includes a request for a group of client stations to transmit the information indicating whether the client station has data that is to be transmitted to the AP. In an embodiment, the polling communication frame 184 prompts each client station to transmit information indicating an amount of data in a particular traffic category (or categories), traffic stream(s), or TID(s) that are to be transmitted to the AP. In an embodiment, the polling communication frame 184 prompts each client station to transmit information indicating an amount of data in all traffic categories, traffic streams, or TIDs that are to be transmitted to the AP.

In an embodiment, the polling communication frame 184 includes a group identifier (ID) that indicates a group of client stations. In one embodiment, the AP previously communicates to the client stations which client stations are in the group corresponding to the group ID. For example, in one embodiment, the AP previously transmits a group definition frame that indicates a group ID and also includes a plurality of association IDs (AIDs) that identify client stations that belong to the group corresponding to the group ID. Subsequently, when the AP transmits the polling communication frame 184 with the group ID, the client stations belonging to the group ID recognize that they are being requested to transmit information indicating whether they have data that is to be transmitted to the AP. In this embodiment, the order of AIDs in the group definition frame indicates the order in which the client stations belonging to the group ID are to transmit the FB frames 158.

In another embodiment, the polling communication frame 184 includes the group ID and the plurality of AIDs that identify client stations that belong to the group corresponding to the group ID. In an embodiment, the order of AIDs in the group definition frame indicates the order in which the client stations belonging to the group ID are to transmit the FB frames 158. In one embodiment, the polling communication frame 184 is a group definition frame with an indicator (e.g., a field, a flag, etc., in a PHY header or a MAC header) that indicates that client stations in the group corresponding to the group ID should transmit to the AP information regarding whether the client stations have data that is to be transmitted to the AP.

In one embodiment in which the polling communication frame 184 includes the group ID, the polling communication frame 184 also includes information (e.g., a bitmap, with each bit corresponding to a client station in the group) that indicates which stations in the group corresponding to the group ID are to transmit information indicating whether the client station has data that is to be transmitted to the AP. For example, in an embodiment, a polling communication frame 184 includes a group ID and information indicating a subset of client stations in the group that are to transmit information indicating whether there is data that is to be transmitted to the AP.

In response to the polling communication frame 184, each client station transmits a FB frame 158 to the AP during the TXOP of the AP, where the FB frame 158 includes information indicating whether the client station has data to be transmitted to the AP.

In one embodiment, when the multiple client stations transmit independent data simultaneously to the AP during the TXOP of the AP in one or more transmissions 166, the client stations disregard a network allocation vector (NAV) in the communication frame 162 that may, in other scenarios, indicate to a client station that they are not yet permitted to transmit. When the client stations disregard the NAV, the client stations can transmit communication frames 166 during the TXOP of the AP.

In another embodiment, the communication frame 162 includes a reverse direction grant (RDG) indicator that indicates that the client stations are permitted to transmit communication frames 166 during the TXOP of the AP.

Figure 4A:
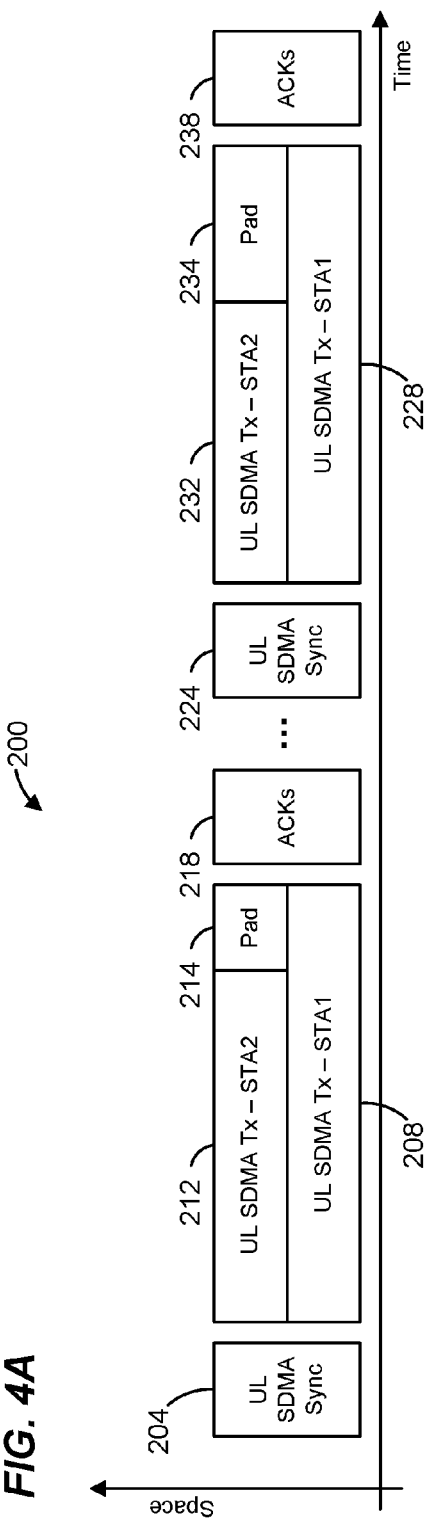
FIGS. 4A and 4B are diagrams of other example transmission sequences in a WLAN, according to other embodiments.

FIG. 4A is a diagram of an example transmission sequence 200 in a WLAN, such as the WLAN 10 of FIG. 1, according to another embodiment, in which an AP prompts a first client station (STA1) and a second client station (STA2) to transmit independent data simultaneously to the AP during the TXOP of the AP.

The AP generates and transmits a communication frame 204 that prompts STA1 and STA2 to transmit independent data simultaneously to the AP during the TXOP of the AP. In one embodiment, the AP generates and transmits a communication frame 204 that prompts STA1 and STA2 to transmit independent data simultaneously to the AP via different spatial streams. In one embodiment, the AP generates and transmits an UL SDMA Sync frame 204 to prompt STA1 and STA2 to transmit independent data simultaneously to the AP via different spatial streams. In another embodiment, the AP generates and transmits a communication frame that prompts STA1 and STA2 to transmit independent data simultaneously to the AP via different respective sets of OFDM subchannels.

In one embodiment, the communication frame 204 includes a duration field (e.g., an UL physical layer protocol data unit (PPDU) duration field) that indicates a maximum duration of UL communication frames (e.g., PPDUs) responsive to the communication frame 204. In one embodiment, the communication frame 204 comprises a PHY preamble and omits a MAC portion. In this embodiment, the PHY preamble includes a group ID and a duration field that indicates a maximum duration of UL communication frames (e.g., PPDUs) responsive to the communication frame 204.

Responsive to the communication frame 204, STA1 and STA2 transmit independent data simultaneously to the AP during the TXOP of the AP. For example, in an embodiment, STA1 transmits a communication frame 208 and STA2 simultaneously transmits a communication frame 212. In one embodiment, the communication frame 208 and the communication frame 212 are transmitted using different spatial streams. In an embodiment, a duration of the communication frame 208 and a duration of the communication frame 212 are less than or equal to the maximum duration indicated in the communication frame 204. Thus, in an embodiment, STA1 and STA2 generate the communication frame 208 and the communication frame 212 to have a duration less than or equal to the maximum duration indicated in the communication frame 204. In one embodiment, if the communication frame 212 is less than the maximum duration indicated in the communication frame 204, STA2 includes padding 214 to increase the total duration to the maximum duration. In another embodiment, the padding 214 is omitted. In one embodiment, both frames 212 and 208 are padded to the maximum duration if they are shorter than the maximum duration.

The AP generates and transmits acknowledgments (ACKs) 218 to STA1 and STA2 to acknowledge the communication frame 208 and the communication frame 212. In another embodiment, the AP utilizes block ACKs.

Similarly, the AP can continue generating and transmitting communication frames that prompt STA1 and STA2 to transmit independent data simultaneously to the AP during the remaining TXOP of the AP. For example, the AP generates and transmits a communication frame 224 that prompts STA1 and STA2 to transmit independent data simultaneously to the AP during the TXOP of the AP. In one embodiment, STA 1 and STA 2 include updated pending data queue information in the uplink transmissions 212 and 208. In this embodiment, the AP utilizes the updated pending data queue information to determine a subsequent maximum duration, and the AP includes information indicating the maximum duration in the next UL SDMA Sync frame 224.

Responsive to the communication frame 224, STA1 and STA2 transmit independent data simultaneously to the AP during the TXOP of the AP. For example, in an embodiment, STA1 transmits a communication frame 228 and STA2 simultaneously transmits a communication frame 232. In one embodiment, if the communication frame 232 is less than the maximum duration indicated in the communication frame 224, STA2 includes padding 234 to increase the total duration to the maximum duration. In another embodiment, the padding 234 is omitted.

The AP generates and transmits ACKs 238 to STA1 and STA2 to acknowledge the communication frame 228 and the communication frame 232. In another embodiment, the AP utilizes block ACKs.

In an embodiment, one of STA1 and STA2 may stop transmitting communication frames in the TXOP of the AP earlier than the other of the STA1 and STA2. In another embodiment, padding is utilized to ensure that STA1 and STA2 simultaneously transmit communication frames throughout the TXOP of the AP.

Figure 4B:
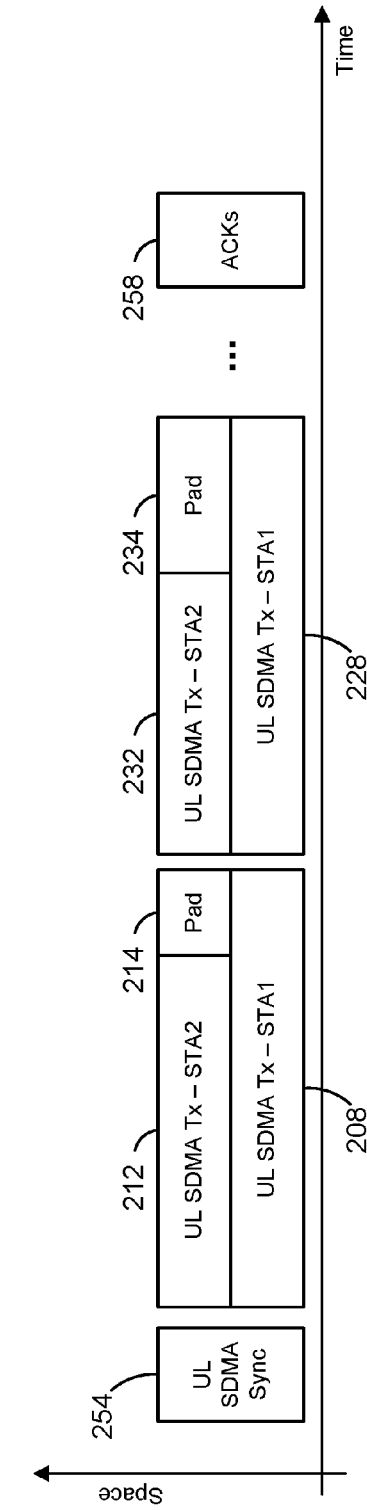

FIG. 4B is a diagram of another example transmission sequence 250 in a WLAN, such as the WLAN 10 of FIG. 1, according to another embodiment, in which an AP prompts STA1 and STA2 to transmit independent data simultaneously to the AP during the TXOP of the AP.

The AP generates and transmits a communication frame 254 that prompts STA1 and STA2 to transmit independent data simultaneously to the AP during the TXOP of the AP. In one embodiment, the AP generates and transmits a communication frame 254 that prompts STA1 and STA2 to transmit independent data simultaneously to the AP via different spatial streams. In one embodiment, the AP generates and transmits an UL SDMA Sync frame 254 to prompt STA1 and STA2 to transmit independent data simultaneously to the AP via different spatial streams. In another embodiment, the AP generates and transmits a communication frame that prompts STA1 and STA2 to transmit independent data simultaneously to the AP via different respective sets of OFDM subchannels.

In one embodiment, the communication frame 254 prompts STA1 and STA2 to transmit one or more UL SDMA communication frames. In an embodiment, the communication frame 254 includes a duration field (e.g., an UL PPDU duration field) that indicates a maximum duration of each UL communication frame (e.g., PPDU) responsive to the communication frame 254. In one embodiment, the communication frame 254 comprises a PHY preamble and omits a MAC portion. In this embodiment, the PHY preamble includes a group ID and a duration field that indicates a maximum duration of UL communication frames (e.g., PPDUs) responsive to the communication frame 254.

In an embodiment, the communication frame 254 includes an indicator of a number of UL transmissions permitted in response to the communication frame 254. In one embodiment, the communication frame 254 comprises a PHY preamble and omits a MAC portion. In this embodiment, the PHY preamble includes a number of UL transmissions fields that indicates a maximum number of UL communication frames (e.g., PPDUs) responsive to the communication frame 254.

In another embodiment, the communication frame 254 includes scheduling information to indicate when UL communication frames are to be transmitted. In an embodiment, the scheduling information includes information indicating when each UL communication frame is to be transmitted. In an embodiment, the scheduling information includes information indicating a duration of each UL communication frame. In an embodiment, all UL communication frames have a same duration. In another embodiment, different UL communication frames can have different durations.

Responsive to the communication frame 254, STA1 and STA2 transmit independent data simultaneously to the AP during the TXOP of the AP. For example, in an embodiment, STA1 transmits the communication frame 208 and STA2 simultaneously transmits the communication frame 212.

Also, responsive to the communication frame 254, STA1 transmits the communication frame 228 and STA2 simultaneously transmits the communication frame 232.

The AP generates and transmits block ACKs 258 to STA1 and STA2 to acknowledge the communication frames 208, 212, 228, and 232. In another embodiment, the AP generates and transmits ACKs to STA1 and STA2 that are transmitted between UL simultaneous data transmissions.

In an embodiment, one of STA1 and STA2 may stop transmitting communication frames in the TXOP of the AP earlier than the other of the STA1 and STA. In another embodiment, padding is utilized to ensure that STA1 and STA2 simultaneously transmit communication frames throughout the TXOP of the AP.

Figure 5A:
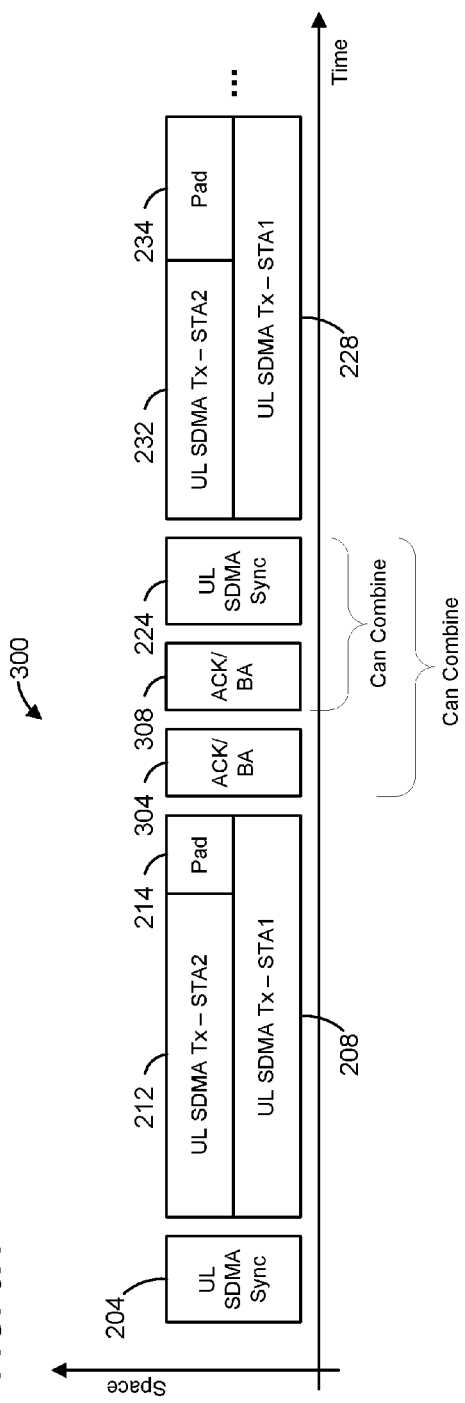
FIGS. 5A and 5B are diagrams of other example transmission sequences in a WLAN, according to other embodiments.

FIG. 5A is a diagram of an example transmission sequence 300 in a WLAN, such as the WLAN 10 of FIG. 1, according to another embodiment, in which an AP prompts a first client station (STA1) and a second client station (STA2) to transmit independent data simultaneously to the AP during the TXOP of the AP. The transmission sequence 300 is similar to the transmission sequence 200 of FIG. 4A, but illustrates ACK transmissions by the AP, according to an embodiment, in more detail.

In an embodiment, the AP generates and transmits an ACK 304 that acknowledges the STA1 transmission 208. The AP also generates and transmits an ACK 308 that acknowledges the STA2 transmission 208, 212. Additionally, the AP generates and transmits the communication frame 224 to prompt STA1 and STA2 to transmit subsequent independent data simultaneously to the AP during the remaining TXOP of the AP. In an embodiment, the ACK 304, the ACK 308 and the communication frame 224 are separated by a suitable time period such as a short interframe space (SIFS).

In another embodiment, the AP generates and transmits the ACK 308 and the communication frame 224 as a single communication frame. In this embodiment, the ACK 304 and the combined ACK 308/communication frame 224 are separated by a suitable time period such as a SIFS. In another embodiment, the AP generates and transmits the ACK 304, the ACK 308 and the communication frame 224 as a single communication frame. In another embodiment, the AP generates and transmits the ACK 304 and the ACK 308 as a single communication frame. In this embodiment, the combined ACK 304/ACK 308 and the communication frame 224 are separated by a suitable time period such as a SIFS.

Figure 5B:
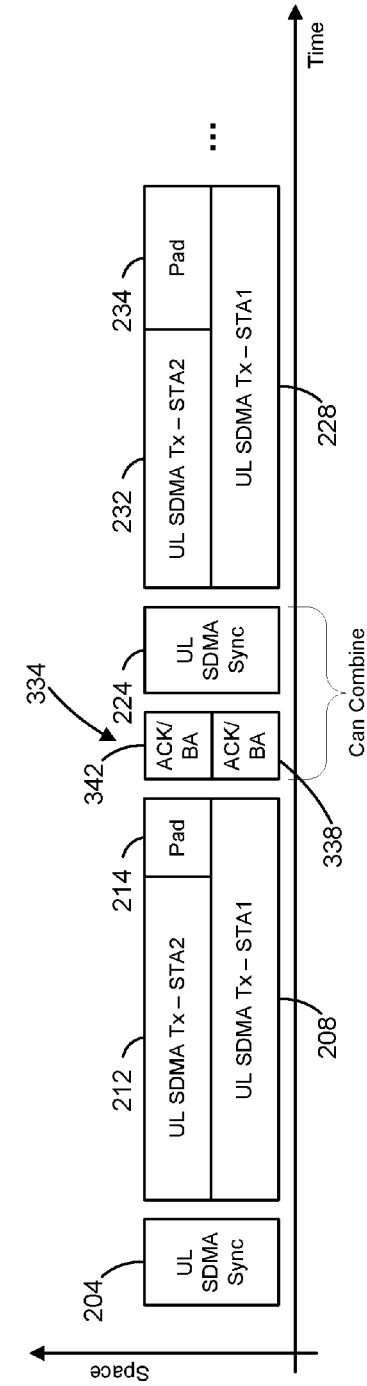

FIG. 5B is a diagram of an example transmission sequence 330 in a WLAN, such as the WLAN 10 of FIG. 1, according to another embodiment, in which an AP prompts a first client station (STA1) and a second client station (STA2) to transmit independent data simultaneously to the AP during the TXOP of the AP. The transmission sequence 330 is similar to the transmission sequence 300 of FIG. 5A, but the AP simultaneously transmits independent ACK information to STA1 and STA2, according to an embodiment.

In particular, the AP generates and transmits an ACK 334 that acknowledges both the STA1 transmission 208 and the STA2 transmission 208, 212. The ACK 334 includes an ACK 338 that acknowledges the STA1 transmission 208 transmitted simultaneously with an ACK 342 that acknowledges the STA2 transmission 212. In one embodiment, the ACK 338 and the ACK 342 are transmitted simultaneously via different spatial streams. In another embodiment, the ACK 338 and the ACK 342 are transmitted simultaneously via different respective sets of OFDM subchannels.

Additionally, the AP generates and transmits the communication frame 224 to prompt STA1 and STA2 to transmit subsequent independent data simultaneously to the AP during the remaining TXOP of the AP. In an embodiment, the ACK 334 and the communication frame 224 are separated by a suitable time period such as a short interframe space (SIFS). In another embodiment, the AP generates and transmits the ACK 334 and the communication frame 224 as a single communication frame.

Referring now to FIGS. 5A and 5B, some or all of the ACKs 304, 308, 338, 342 can be block acknowledgments (BAs), in some embodiments and/or scenarios, that acknowledge a plurality of transmissions from STA1 or STA2.

Figure 6:
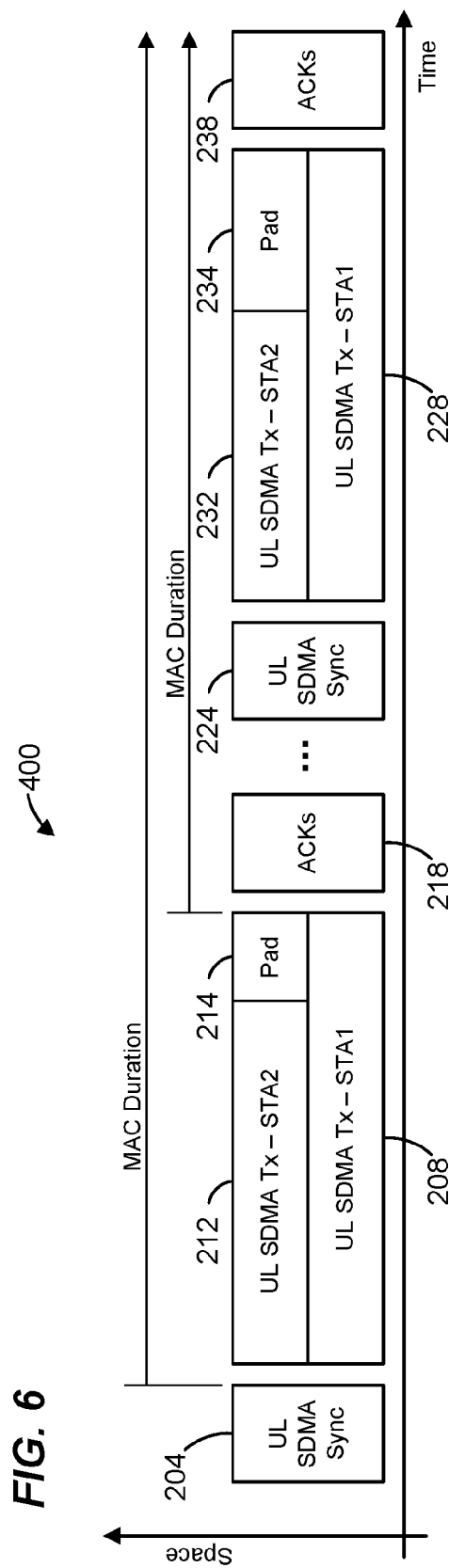
FIG. 6 is a diagram of another example transmission sequence in a WLAN, according to an embodiment.

FIG. 6 is a diagram of an example transmission sequence 400 in a WLAN, such as the WLAN 10 of FIG. 1, according to another embodiment, in which an AP prompts a first client station (STA1) and a second client station (STA2) to transmit independent data simultaneously to the AP during the TXOP of the AP. The transmission sequence 400 is similar to the transmission sequence 200 of FIG. 4A, but illustrates example techniques, according to an embodiment, for protecting UL transmissions in the TXOP of the AP in more detail.

The communication frame 204 includes a duration field. In an embodiment, the duration field is included in a MAC header of the communication frame 204. In another embodiment, a PHY header of the communication frame additionally or alternatively includes a similar duration field. In other scenarios, a duration field of a communication frame is set to a value to indicate a length of the communication frame. In the transmission sequence 400, however, the AP sets a value of the duration field of the communication frame 204 to a value corresponding to a remaining duration of the TXOP of the AP. Other communication devices that receive the communication frame 204 utilize the duration field to determine that they cannot transmit during the time period indicated by the duration field, unless given permission by the AP and/or unless acknowledging a transmission by the AP.

In an embodiment, each UL data communication frame generated and transmitted by STA1 and STA2 in the TXOP of the AP also includes a duration field (e.g., in the MAC header and/or in the PHY header). In an embodiment, STA1 sets a value of the duration field of the communication frame 208 to a value corresponding to a remaining duration of the TXOP of the AP. Similarly, STA2 sets a value of the duration field of the communication frame 212, 214 to the value corresponding to the remaining duration of the TXOP of the AP. Other communication devices that receive the communication frame 208/212/214 utilize the duration field to determine that they cannot transmit during the time period indicated by the duration field, unless given permission by the AP and/or unless acknowledging a transmission by the AP.

FIG. 7A is a diagram of an example transmission sequence 440 in a WLAN, such as the WLAN 10 of FIG. 1, according to another embodiment, in which an AP prompts multiple client stations to transmit independent data simultaneously to the AP during the TXOP of the AP. The transmission sequence 440 is similar to the transmission sequence 150 of FIG. 3A, but illustrates example techniques, according to an embodiment, for protecting UL transmissions in the TXOP of the AP in more detail.

In an embodiment, each polling communication frame 154 includes a duration field such as discussed above with respect to FIG. 6. In the transmission sequence 440, the AP sets a value of the duration field of each polling communication frame 154 to a value corresponding to a remaining duration of the TXOP of the AP. Other communication devices that receive a polling communication frame 154 utilize the duration field to determine that they cannot transmit during the time period indicated by the duration field, unless given permission by the AP and/or unless acknowledging a transmission by the AP.

In an embodiment, each FB communication frame 158 generated and transmitted by the multiple client stations in the TXOP of the AP also includes a duration field such as discussed with respect to FIG. 6. In an embodiment, each corresponding client station sets a value of the duration field of the FB communication frame 158 to a value corresponding to a remaining duration of the TXOP of the AP. Other communication devices that receive a FB communication frame 158 utilize the duration field to determine that they cannot transmit during the time period indicated by the duration field, unless given permission by the AP and/or unless acknowledging a transmission by the AP.

FIG. 7B is a diagram of an example transmission sequence 480 in a WLAN, such as the WLAN 10 of FIG. 1, according to another embodiment, in which an AP prompts multiple client stations to transmit independent data simultaneously to the AP during the TXOP of the AP. The transmission sequence 480 is similar to the transmission sequence 180 of FIG. 3B, but illustrates example techniques, according to an embodiment, for protecting UL transmissions in the TXOP of the AP in more detail.

In an embodiment, the polling communication frame 184 includes a duration field such as discussed above with respect to FIG. 6. In the transmission sequence 480, the AP sets a value of the duration field of the polling communication frame 184 to a value corresponding to a remaining duration of the TXOP of the AP. Other communication devices that receive the polling communication frame 184 utilize the duration field to determine that they cannot transmit during the time period indicated by the duration field, unless given permission by the AP and/or unless acknowledging a transmission by the AP.

Similar to FIG. 7A, each corresponding client station sets a value of the duration field of the FB communication frame 158 to a value corresponding to a remaining duration of the TXOP of the AP.

Figure 8:
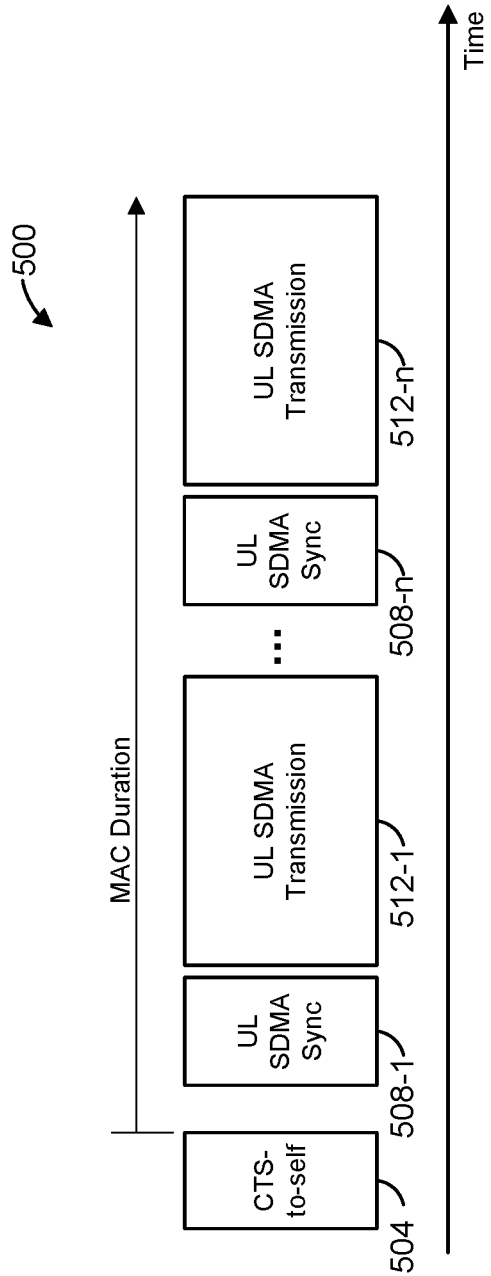
FIG. 8 is a diagram of another example transmission sequence in a WLAN, according to an embodiment.

FIG. 8 is a diagram of an example transmission sequence 500 in a WLAN, such as the WLAN 10 of FIG. 1, according to another embodiment, in which an AP prompts multiple client stations to transmit independent data simultaneously to the AP during the TXOP of the AP. The transmission sequence 500 illustrates another example technique, according to an embodiment, for protecting UL transmissions in the TXOP of the AP.

The AP generates and transmits a clear to send to self (CTS-to-self) communication frame 504. The CTS-to-self communication frame 504 includes a duration field, such as described above with respect to FIG. 6, that indicates to client stations to refrain transmitting during a period indicated by a value of the duration field, unless given permission by the AP and/or unless acknowledging a transmission by the AP. The AP sets a value of the duration field of the CTS-to-self communication frame 504 to a value corresponding to a remaining duration of the TXOP of the AP. Other communication devices that receive the CTS-to-self communication frame 504 utilize the duration field to determine that they cannot transmit during the time period indicated by the duration field, unless given permission by the AP and/or unless acknowledging a transmission by the AP.

The AP transmits one or more communication frames 508 that each prompts multiple client stations to transmit independent data simultaneously to the AP during the TXOP of the AP such as described above. Responsive to the one or more communication frames 508, the multiple client stations transmit independent data simultaneously to the AP during the TXOP of the AP. For example, in an embodiment, multiple client stations transmit one or more communication frames 512 that include independent data transmitted by multiple client stations.

Figure 9:
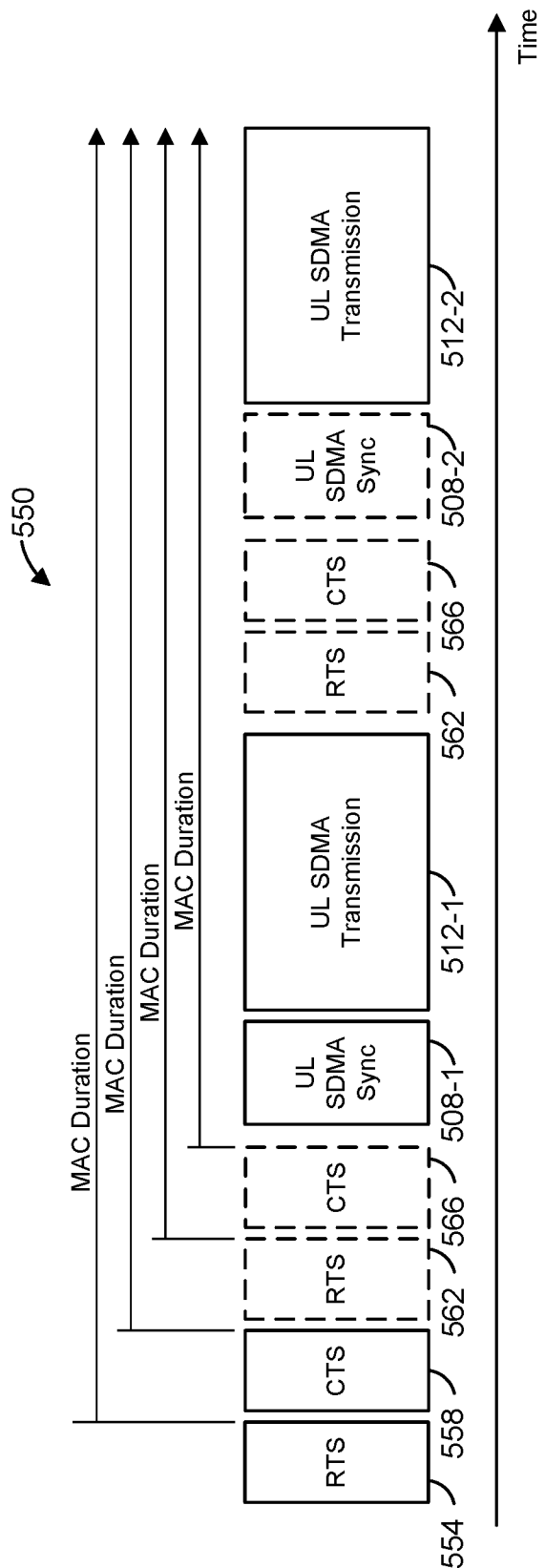
FIG. 9 is a diagram of another example transmission sequence in a WLAN, according to an embodiment.

FIG. 9 is a diagram of an example transmission sequence 550 in a WLAN, such as the WLAN 10 of FIG. 1, according to another embodiment, in which an AP prompts multiple client stations to transmit independent data simultaneously to the AP during the TXOP of the AP. The transmission sequence 550 illustrates another example technique, according to an embodiment, for protecting UL transmissions in the TXOP of the AP.

The AP generates and transmits a request to send (RTS) communication frame 554 to a first client station (STA1). The AP sets a value of the duration field of the RTS communication frame 554 to a value corresponding to a remaining duration of the TXOP of the AP.

In response to the RTS communication frame 554, STA1 generates and transmits a CTS communication frame 558. STA1 sets a value of the duration field of the CTS communication frame 558 to a value corresponding to a remaining duration of the TXOP of the AP.

In some embodiments, the AP generates and transmits an RTS communication frame for each of a plurality of client stations that the AP will prompt to transmit independent data simultaneously to the AP. The AP sets a value of the duration field of each RTS communication frame to a value corresponding to a remaining duration of the TXOP of the AP. In these embodiments, each client station (to which the AP transmits an RTS) generates and transmits a corresponding CTS communication frame. Each client sets a value of the duration field of the corresponding CTS communication frame to a value corresponding to a remaining duration of the TXOP of the AP.

For example, in an embodiment, the AP generates and transmits an RTS communication frame 562 to a second client station (STA2). The AP sets a value of the duration field of the RTS communication frame 562 to a value corresponding to a remaining duration of the TXOP of the AP.

In response to the RTS communication frame 562, STA2 generates and transmits a CTS communication frame 566. STA2 sets a value of the duration field of the CTS communication frame 566 to a value corresponding to a remaining duration of the TXOP of the AP.

The AP transmits one or more communication frames 508 that each prompts multiple client stations to transmit independent data simultaneously to the AP during the TXOP of the AP such as described above. Responsive to the one or more communication frames 508, the multiple client stations transmit independent data simultaneously to the AP during the TXOP of the AP. For example, in an embodiment, multiple client stations transmit one or more communication frames 512 that include independent data transmitted by multiple client stations.

In one embodiment, the AP does not generate and transmit the communication frame 508-2. In this embodiment, the communication frame 508-1 prompts STA1 and STA2 to transmit both of communication frames 512-1 and 512-2.

In one embodiment, the AP transmits the RTS 562 prior to transmitting any of the one or more communication frames 508. In this embodiment, STA2 transmits the CTS communication frame 566 prior to the AP transmitting any of the one or more communication frames 508.

In another embodiment, the AP transmits the RTS 562 in between different communication frames 512. In this embodiment, STA2 transmits the CTS communication frame 566 in between different communication frames 512.

In another embodiment, the AP generates and transmits a single RTS to all involved STAs and the STAs then generate and transmit CTSs back to the AP one by one according to a schedule or sequence included in the single RTS or according to the group member sequence.

Figure 10:
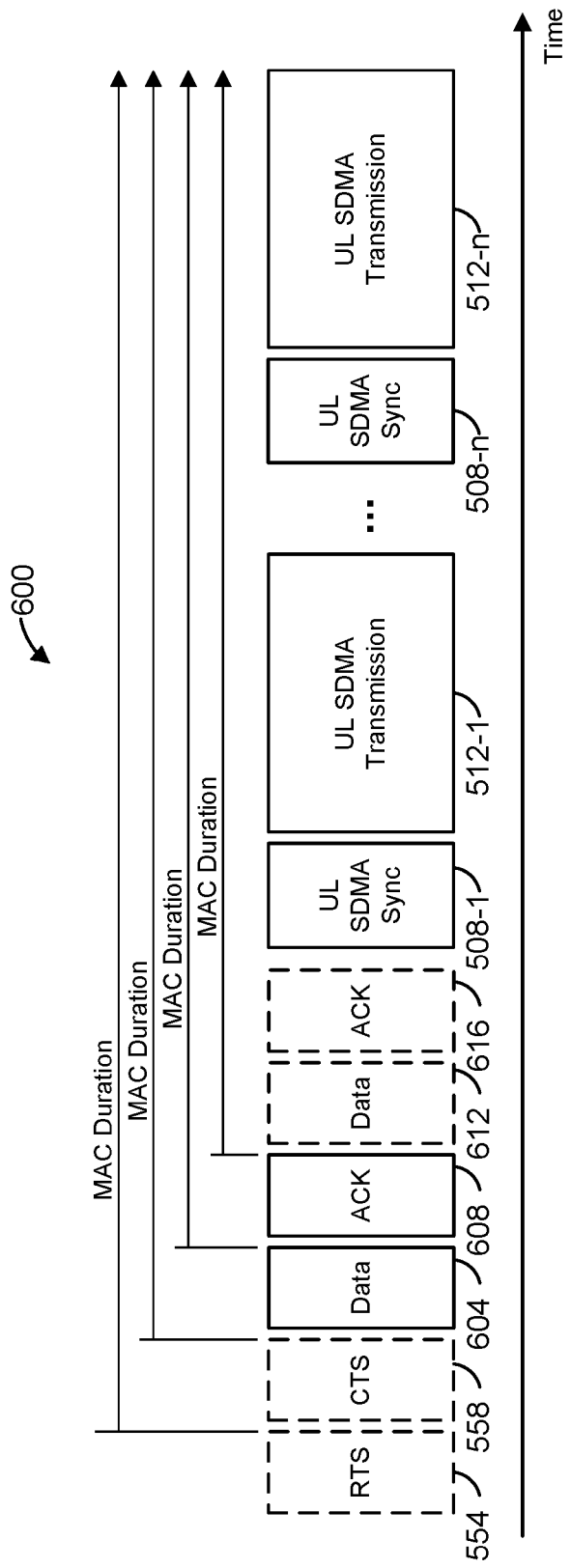
FIG. 10 is a diagram of another example transmission sequence in a WLAN, according to an embodiment.

FIG. 10 is a diagram of an example transmission sequence 600 in a WLAN, such as the WLAN 10 of FIG. 1, according to another embodiment, in which an AP prompts multiple client stations to transmit independent data simultaneously to the AP during the TXOP of the AP. The transmission sequence 600 illustrates another example technique, according to an embodiment, for protecting UL transmissions in the TXOP of the AP.

The AP generates and transmits a request to send (RTS) communication frame 554 to a first client station (STA1). The AP sets a value of the duration field of the RTS communication frame 554 to a value corresponding to a remaining duration of the TXOP of the AP.

In response to the RTS communication frame 554, STA1 generates and transmits a CTS communication frame 558. STA1 sets a value of the duration field of the CTS communication frame 558 to a value corresponding to a remaining duration of the TXOP of the AP.

In another embodiment, the AP does not generate and transmit the RTS communication frame 554, and STA1 does not generate and transmit the CTS communication frame 558.

In some embodiments, the AP generates and transmits a data communication frame for each of one or more of a plurality of client stations that the AP will prompt to transmit independent data simultaneously to the AP. The AP sets a value of the duration field of each data communication frame to a value corresponding to a remaining duration of the TXOP of the AP. In these embodiments, each client station (to which the AP transmits a data communication frame) generates and transmits an ACK communication frame. Each client sets a value of the duration field of the corresponding ACK communication frame to a value corresponding to a remaining duration of the TXOP of the AP.

For example, in an embodiment, the AP generates and transmits a data communication frame 604 to STA1. The AP sets a value of the duration field of the data communication frame 604 to a value corresponding to a remaining duration of the TXOP of the AP.

In response to the data communication frame 604, STA1 generates and transmits an ACK communication frame 608. STA1 sets a value of the duration field of the ACK communication frame 608 to a value corresponding to a remaining duration of the TXOP of the AP.

In an embodiment, the AP generates and transmits a data communication frame 612 to a second client station (STA2). The AP sets a value of the duration field of the data communication frame 612 to a value corresponding to a remaining duration of the TXOP of the AP.

In response to the data communication frame 612, STA2 generates and transmits an ACK communication frame 616. STA2 sets a value of the duration field of the ACK communication frame 616 to a value corresponding to a remaining duration of the TXOP of the AP.

In one embodiment, the AP does not generate and transmit the data communication frame 612, and STA2 does not generate and transmit the ACK communication frame 616.

In another embodiment, the AP does not generate and transmit the data communication frame 604, and STA1 does not generate and transmit the ACK communication frame 608.

The AP transmits one or more communication frames 508 that each prompts multiple client stations to transmit independent data simultaneously to the AP during the TXOP of the AP such as described above. Responsive to the one or more communication frames 508, the multiple client stations transmit independent data simultaneously to the AP during the TXOP of the AP. For example, in an embodiment, multiple client stations transmit one or more communication frames 512 that include independent data transmitted by multiple client stations.

In one embodiment, the AP does not generate and transmit the communication frame 508-n. In this embodiment, the communication frame 508-1 prompts multiple client stations to transmit both of communication frames 512-1 and 512-n.

In one embodiment, the AP generates and transmits downlink data to one or more STAs during a TXOP of the AP, and if and when the downlink transmissions are completed before the end of the TXOP, the AP can then use the remaining TXOP to poll STAs for simultaneous uplink transmissions. In this embodiment, when the AP conducts downlink transmissions, STAs may include uplink data queue information in response/Acknowledgment frames (such as 608, 616) so that the AP can determine maximum duration(s) of UL SDMA transmissions, and include indications of the maximum duration(s) in the communication frames 508, for example.

Figure 11:
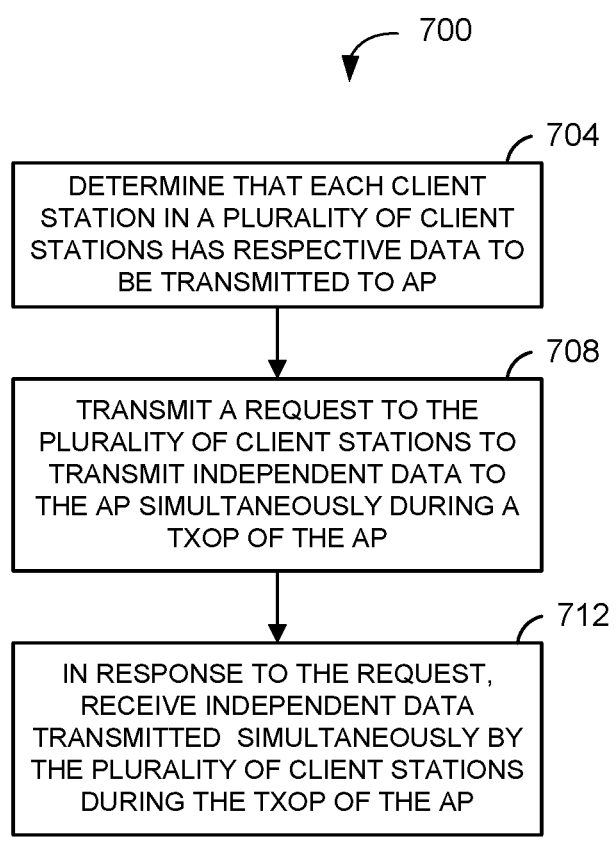
FIG. 11 is a flow diagram of an example method for prompting and receiving independent data simultaneously transmitted by a plurality of client stations.

FIG. 11 is a flow diagram of an example method 700 for prompting and receiving independent data simultaneously transmitted by a plurality of client stations. The method 700 is implemented by a network interface such as the network interface 16 of the AP 14 of FIG. 1, in an embodiment. For example, the network interface 16 is configured to implement the method 700. In other embodiments, the method 700 is implemented by another suitable communication device.

At block 704, the AP determines that each client station in a plurality of client stations has respective data that is to be transmitted to the AP. In some embodiments, the AP receives information indicating that each client station in the plurality of client stations has respective data that is to be transmitted to the AP, and the AP utilizes such information to determine that each client station in the plurality of client stations has respective data that is to be transmitted to the AP. In an embodiment, the AP receives information indicating that a client station has data that is to be transmitted to the AP via a data frame transmitted by the client station, such as discussed above with respect to FIG. 2. In other embodiments, the AP transmits one or more polling communication frames to the plurality of client devices to prompt the plurality of client devices to transmit information indicating that the plurality of client stations have data that is to be transmitted to the AP, such as discussed above with respect to FIGS. 3A and 3B.

In one embodiment, the MAC processing unit 18 and/or the PHY processing unit implements block 704.

At block 708, a request is generated and transmitted to the plurality of client devices. The request is for the plurality of client stations to transmit independent data to the AP simultaneously during a TXOP of the AP. In some embodiments, the request is communication frame that prompts the plurality of client stations to transmit independent data simultaneously to the AP during the TXOP of the AP such as described with respect to FIGS. 4A and 4B.

In one embodiment, the MAC processing unit 18 and the PHY processing unit 20 implement block 708. For example, the MAC processing unit 18 populates fields in a MAC header and/or frame body, and/or causes the PHY processing unit 20 to populate fields in a PHY preamble. As discussed above, in some embodiments, the request indicates one or more of a group ID that identifies the plurality of client stations, a duration that indicates a permitted duration of simultaneous UL transmission, a number of simultaneous UL transmissions, etc.

At block 712, in response to the request of block 708, the AP receives independent data transmitted simultaneously by the plurality of client stations during the TXOP of the AP. In some embodiments, the AP receives independent data transmitted simultaneously by the plurality of client stations such as described with respect to FIGS. 4A and 4B. In an embodiment, the PHY processing unit 20 receives independent data transmitted simultaneously by the plurality of client stations during the TXOP of the AP. In some embodiments, the AP receives the independent data transmitted simultaneously by the plurality of client stations prior to the AP transmitting any media access control (MAC) data to the plurality of client stations subsequent to the second communication device transmitting the request of block 708. For example, in some embodiments, as illustrated in the examples of FIGS. 2, 3A, 3B, 4A, 4B, 5A, 5B, 6, 7A, 7B, 8, 9, and 10, UL SDMA transmissions are received after transmission of the UL SDMA sync without any intervening transmissions from the AP. On the other hand, in the IEEE 802.11n Standard, for example, stations can send data to an AP holding a TXOP only after the AP sends data or a block acknowledgment request (BAR).

In some embodiments, the AP can also seize control of a TXOP that was obtained by a STA. For example, in one embodiment, the AP can seize control of a TXOP of a STA if it determines that, other than the STA that holds the TXOP, other STAs also have pending uplink data for the AP. The AP can seize control of a TXOP when responding to the TXOP holder STA or acknowledging the transmission from the TXOP holder STA, in some embodiments. Once the AP seizes control of a TXOP of a STA, it can start polling STAs for pending uplink data information and/or start polling multiple STAs (including the previous TXOP holder STA) for simultaneous transmissions as if the TXOP was obtained by the AP. For the purposes of this disclosure, a TXOP obtained by a STA and then seized by the AP is considered a TXOP of the AP.

Although the method 700 was described above as being implemented by an AP, in other embodiments, a method similar to the method 700 is implemented by another device such as a client device. For example, in one embodiment, a first client device prompts a plurality of second client devices (and the AP, in some scenarios) to transmit independent data simultaneously to the first client device.

At least some of the various blocks, operations, and techniques described above may be implemented in hardware, a processor executing firmware and/or software instructions, or any combination thereof. When implemented utilizing a processor executing software or firmware instructions, the software or firmware instructions may be stored in any computer readable memory such as on a magnetic disk, an optical disk, or other tangible storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable, tangible computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions stored on a memory of other computer-readable storage medium that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
   receiving, at an access point (AP) device, respective indications of respective amounts of data corresponding to a common traffic identifier (TID), from multiple respective client devices among a plurality of client devices in a wireless local area network (WLAN) to which the AP device belongs, the respective indications of respective amounts of data corresponding to respective data to be transmitted to the AP device from the multiple respective client devices;
   determining, at the AP device, a maximum duration of simultaneous uplink transmissions to be transmitted from the multiple respective client devices, wherein determining the maximum duration includes using the received respective indications of amounts of data from the multiple client devices;
   transmitting, to the multiple respective client devices, a communication frame prompting the multiple respective client devices to simultaneously transmit independent data corresponding to the common TID to the AP device, wherein the communication frame includes an indication of the maximum duration; and
   receiving, at the AP device, respective data streams simultaneously transmitted, in response to the communication frame, by the multiple respective client devices, wherein the respective data streams do not exceed the maximum duration, the respective data streams are received via i) respective spatial streams, or ii) respective sets of orthogonal frequency division multiplexing (OFDM) subchannels, and
   the respective data streams correspond to independent data from the multiple respective client devices, the independent data corresponding to the common TID.

2. The method of claim 1, further comprising:
   determining, at the AP device, that a first client device of the plurality of client devices does not have data to be transmitted to the AP device;
   in response to determining that the first client device does not have data to be transmitted to the AP device, seizing, with the AP device, control of a transmit opportunity period of the first client device, the transmit opportunity period of the first client device being a time period in which a wireless communication medium was reserved for the first client device according to a WLAN protocol; and the AP device using the seized transmit opportunity period in connection with the multiple client devices simultaneously transmitting independent data.

3. The method of claim 1, wherein:
the received respective indications of respective amounts of data from the multiple respective client devices are first received respective indications;
the common TID is a first common TID;
the method further comprises receiving, at the AP device, one or more second respective indications of respective amounts of data corresponding to a second common TID, from one or more respective client devices among the plurality of client devices, the second respective indications of respective amounts of data corresponding to respective data to be transmitted to the AP device from the one or more respective client devices;
the communication frame also prompts the one or more respective client devices to simultaneously transmit independent data corresponding to the second common TID to the AP device; and
the method further comprises receiving, at the AP device, one or more respective further data streams simultaneously transmitted, in response to the communication frame, by the one or more respective client devices, wherein the one or more respective further data streams do not exceed the maximum duration, the one or more respective further data streams are received via i) respective spatial streams, or ii) respective sets of OFDM subchannels, and
the one or more respective further data streams correspond to independent data from the one or more respective client devices, the independent data corresponding to the second common TID.

4. The method of claim 3, wherein:
the one or more respective further data streams corresponding to the second common TID are received after the respective data streams corresponding to the first common TID.

5. The method of claim 4, wherein i) the communication frame is transmitted, ii) the respective data streams corresponding to the first common TID are received, and iii) the one or more respective further data streams corresponding to the second common TID are received, during a transmit opportunity period of the AP device, the transmit opportunity period of the AP device being a time period in which a wireless communication medium is reserved for the AP device according to a WLAN protocol.

6. The method of claim 1, wherein:
each received respective indication of the respective amount of data corresponds to a respective amount of data in a respective queue at the respective client device; and
the respective queue at the respective client device is for storing data corresponding to the common TID.

7. The method of claim 1, wherein:
the respective indications of respective amounts of data correspond to a common TID defined by the IEEE 802.1 le Standard.

8. The method of claim 1, wherein:
the respective indications of respective amounts of data are received in respective data units transmitted to the AP device by the multiple respective client devices.

9. The method of claim 1, further comprising:
transmitting, with the AP device, respective polling communication frames to the multiple respective client devices to prompt the multiple client devices to transmit the respective indications of the respective amounts of data;
wherein the respective indications of respective amounts of data are transmitted by the multiple respective client devices in response to the polling communication frames.

10. The method of claim 1, further comprising:
transmitting, with the AP device, a single polling communication frame to the multiple respective client devices to prompt the multiple client devices to transmit the respective indications of the respective amounts of data;
wherein the respective indications of respective amounts of data are transmitted by the multiple respective client devices in response to the single polling communication frame.

11. An access point (AP) device, comprising:
a wireless network interface device having one or more integrated circuits configured to receive respective indications of respective amounts of data corresponding to a common traffic identifier (TID), from multiple respective client devices among a plurality of client devices in a wireless local area network (WLAN) to which the AP device belongs, the respective indications of respective amounts of data corresponding to respective data to be transmitted to the AP device from the multiple respective client devices,
determine a maximum duration of simultaneous uplink transmissions to be transmitted from the multiple respective client devices, wherein determining the maximum duration includes using the received respective indications of respective amounts of data from the multiple respective client devices,
transmit, to the multiple respective client devices, a communication frame prompting the multiple respective client devices to simultaneously transmit independent data corresponding to the common TID, to the AP device, wherein the communication frame includes an indication of the maximum duration, and
receive respective data streams simultaneously transmitted, in response to the communication frame, by the multiple respective client devices, wherein
the respective data streams do not exceed the maximum duration,
the respective data streams are received via i) respective spatial streams, or ii) respective sets of orthogonal frequency division multiplexing (OFDM) subchannels, and
the respective data streams correspond to independent data from the multiple respective client devices, the independent data corresponding to the common TID.

12. The AP device of claim 11, wherein the one or more integrated circuits are further configured to:
determine that a first client device of the plurality of client devices does not have data to be transmitted to the AP device;
in response to determining that the first client device does not have data to be transmitted to the AP device, seize control of a transmit opportunity period of the first client device, the transmit opportunity period of the first client device being a time period in which a wireless communication medium was reserved for the first client device according to a WLAN protocol; and
use the seized transmit opportunity period in connection with the multiple client devices simultaneously transmitting independent data.

13. The AP device of claim 11, wherein:
the received respective indications of respective amounts of data from the multiple respective client devices are first received respective indications;
the common TID is a first common TID;
the one or more integrated circuits are further configured to
receive one or more second respective indications of respective amounts of data corresponding to a second common TID from one or more respective client devices among the plurality of client devices, the second respective indications of respective amounts of data corresponding to respective data to be transmitted to the AP device from the one or more respective client devices;
the communication frame also prompts the one or more respective client devices to simultaneously transmit independent data corresponding to the second common TID to the AP device;
the one or more integrated circuits are further configured to
receiving one or more respective further data streams simultaneously transmitted, in response to the communication frame, by the one or more respective client devices;
the one or more respective further data streams do not exceed the maximum duration;
the one or more respective further data streams are received via i) respective spatial streams, or ii) respective sets of OFDM subchannels; and
the one or more respective further data streams correspond to independent data from the one or more respective client devices, the independent data corresponding to the second common TID.

14. The AP device of claim 13, wherein:
the one or more respective further data streams corresponding to the second common TID are received after the respective data streams corresponding to the first common TID.

15. The AP device of claim 14, wherein the one or more integrated circuits are further configured to i) transmit the communication frame, ii) receive the respective data streams corresponding to the first common TID, and iii) receive the one or more respective further data streams corresponding to the second common TID, during a transmit opportunity period of the AP device, the transmit opportunity period of the AP device being a time period in which a wireless communication medium is reserved for the AP device according to a WLAN protocol.

16. The AP device of claim 11, wherein:
each received respective indication of the respective amount of data corresponds to a respective amount of data in a respective queue at the respective client device; and
the respective queue at the respective client device is for storing data corresponding to the common TID.

17. The AP device of claim 11, wherein:
the respective indications of respective amounts of data correspond to a common TID defined by the IEEE 802.1 le Standard.

18. The AP device of claim 11, wherein:
the respective indications of respective amounts of data are received in the respective data units transmitted to the AP device by the multiple respective client devices.

19. The AP device of claim 11, wherein the one or more integrated circuits are further configured to:
transmit respective polling communication frames to the multiple respective client devices to prompt the multiple client devices to transmit the respective indications of the respective amounts of data;
wherein the respective indications of respective amounts of data are transmitted by the multiple respective client devices in response to the polling communication frames.

20. The AP device of claim 11, wherein the one or more integrated circuits are further configured to:
transmit a single polling communication frame to the multiple respective client devices to prompt the multiple client devices to transmit the respective indications of the respective amounts of data;
wherein the respective indications of respective amounts of data are transmitted by the multiple respective client devices in response to the single polling communication frame.

* * * * *